Figure 1:
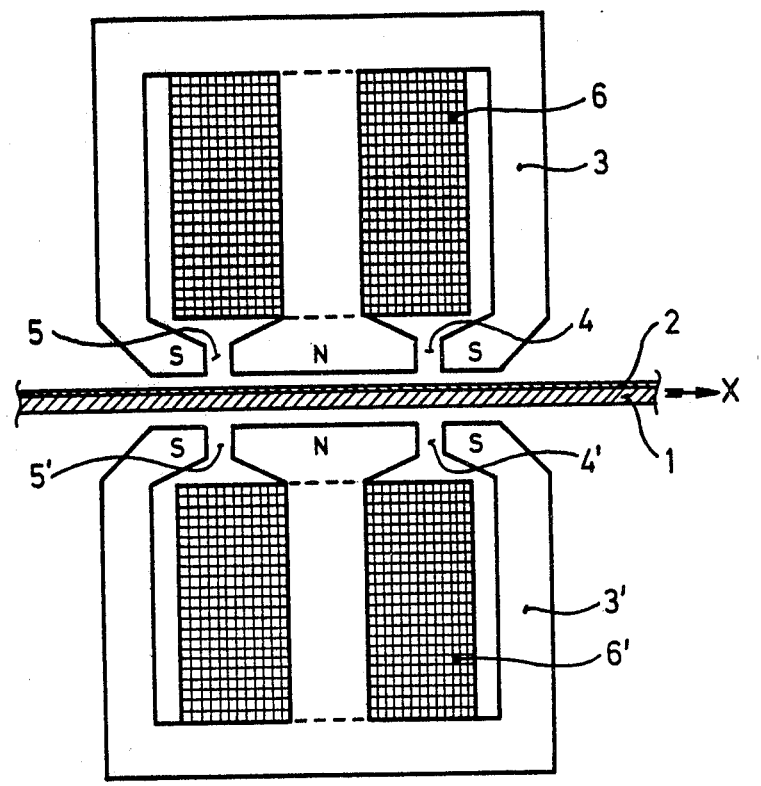

United States Patent [19]

Koester et al.

[11] 4,382,244

[45] May 3, 1983

[54] DEVICE FOR MAGNETICALLY ORIENTING THE MAGNETIZABLE PARTICLES OR MAGNETIC RECORDING MEDIA IN A PREFERRED DIRECTION

[75] Inventors: Eberhard Koester, Frankenthal; Paul Deigner, Willstaett; Dieter Schaefer, Lindenberg; Karl Uhl, Frankenthal; Roland Falk, Achern, all of Fed. Rep. of Germany

[73] Assignee: BASF Aktiengesellschaft, Ludwigshafen, Fed. Rep. of Germany

[21] Appl. No.: 242,560

[22] Filed: Mar. 11, 1981

[30] Foreign Application Priority Data

Mar. 21, 1980 [DE] Fed. Rep. of Germany ....... 3010873

[51] Int. Cl.³ .............................................. H01F 7/20
[52] U.S. Cl. ..................................... 335/284; 118/640
[58] Field of Search ....................... 118/640; 335/284; 340/870.31, 870.32; 360/134, 135; 361/143, 151, 225, 226; 427/47-48, 49.1, 127-132

[56] References Cited

U.S. PATENT DOCUMENTS

| 2,711,901 | 6/1955 | von Behren . |
| 3,117,065 | 1/1964 | Wooten . |
| 3,162,792 | 12/1964 | Hackley et al. . |
| 4,043,297 | 8/1977 | Hartmann et al. .............. 335/284 X |

FOREIGN PATENT DOCUMENTS

| 2444971 | 4/1976 | Fed. Rep. of Germany . |
| 877633 | 9/1961 | United Kingdom . |

Primary Examiner—William M. Shoop
Attorney, Agent, or Firm—Keil & Witherspoon

[57] ABSTRACT

A device for magnetically orienting the magnetizable particles of magnetic recording media in a preferred direction, which media are obtained by applying a coating of anisotropically magnetic particles finely dispersed in a solution of an organic binder system and conventional additives to a non-magnetic base, and subsequently solidifying the coating, by the action, on the still fluid coating, of the magnetic fields produced by two E-shaped electromagnets arranged symmetrically with respect to, and in mirror-image relationship to, the plane of the said coating.

1 Claim, 4 Drawing Figures

DEVICE FOR MAGNETICALLY ORIENTING THE MAGNETIZABLE PARTICLES OR MAGNETIC RECORDING MEDIA IN A PREFERRED DIRECTION

The present invention relates to a device for magnetically orienting the magnetizable particles of magnetic recording media in a preferred direction, which media are obtained by applying a coating of anisotropically magnetic particles finely dispersed in a solution of an organic binder system and conventional additives to a non-magnetic base, and subsequently solidifying the coating, by the action, on the still fluid coating, of the magnetic fields produced by two electromagnets arranged symmetrically with respect to, and in mirror-image relationship to, the plane of the said coating.

In the conventional processes for the manufacture of coated magnetic recording media, a dispersion of magnetically anisotropic particles in a binder system is applied in a thin coating to a base material, and the binder is cured. These processes usually include an orientation step in which the magnetically anisotropic particles are aligned by means of a magnetic field of the appropriate configuration, with their longest axes parallel to the surface of the base and to the recording direction. It is known from U.S. Pat. No. 2,711,901 to use an arrangement of like magnetic poles, symmetrical to the plane of the base material, to create a magnetic field parallel to that plane. Other apparatus disclosed in British Pat. No. 877,633 and U.S. Pat. No. 3,162,792 comprise magnets, between the pole shoes of which the base carrying the still fluid coating is passed. However, all these apparatus have the disadvantage that, on the sides of the magnets facing away from the coated base, there is created a field which opposes the orienting field proper. The orientation of the magnetic particles is partially cancelled by this opposing field, which has an adverse effect on the recording media. There have therefore been attempts to develop magnet assemblies which do not have this opposing field. For example, German Laid-Open Application DOS No. 2,444,971 discloses an apparatus for improving the orientation of the magnetic particles in magnetic tapes, wherein a plurality of correction magnets, with poles of like polarity arranged opposite one another, are located downstream of the orienting field proper. In U.S. Pat. No. 4,003,336 magnets are used to orient the magnetic particles in the production of recording media, the pole shoes of which have, on the outer edges adjacent to the coated base and running parallel to the air gaps, screening elements which are so shaped that the distance between the surfaces of the screening elements facing the coated base increases as the screening elements extend away from the pole shoes. Similar assemblies are described in U.S. Pat. No. 3,117,065 in which the poles shoes are provided with projecting members which extend a distance in the direction of tape movement and terminate in outwardly turned edges. These apparatus, however, require additional equipment for their manufacture.

It is therefore an object of the invention to provide a device for magnetically orienting the magnetizable particles of magnetic recording media in a preferred direction, said media having a coating containing anisotropically magnetic particles, which produces in a simple manner an orienting field without creating opposing fields which interfere with the orientation of the particles.

We have now found that this object is achieved with a device for magnetically orienting the magnetizable particles of magnetic recording media in a preferred direction, which media are obtained by applying a coating of anisotropically magnetic particles finely dispersed in a solution of an organic binder system and conventional additives to a nonmagnetic base, and subsequently solidifying the coating, by the action, on the still fluid coating, of the magnetic fields produced by two electromagnets which are arranged symmetrically with respect to, and in mirror-image relationship to, the plane of the said coating, and between the pole shoes of which air gaps are formed, if the two electromagnets are E-shaped and each have three pole shoes between which two coplanar air gaps are formed, and the coils are wound on the middle legs of the E-shaped magnets.

With the novel orienting device it is possible to eliminate in a simple manner not only the component of the orienting field which is vertical to the surface of the magnetic coating and interferes with the orientation of the anisotropically magnetic particles, but also the fields opposing the orienting field which cut through the magnetic coating.

Figure 2:
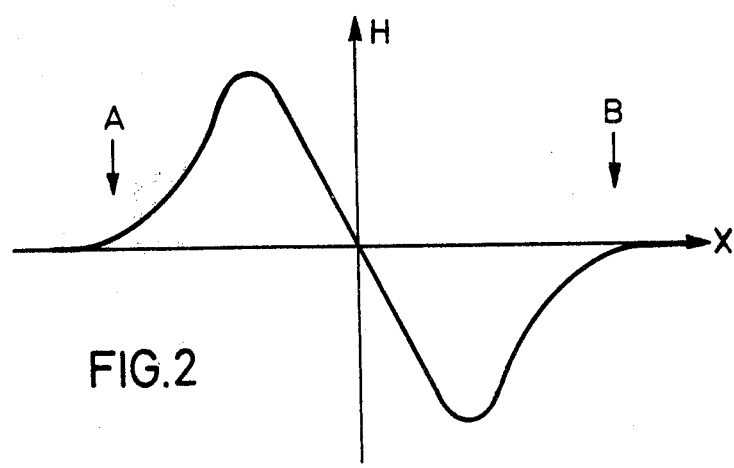
Figure 3:
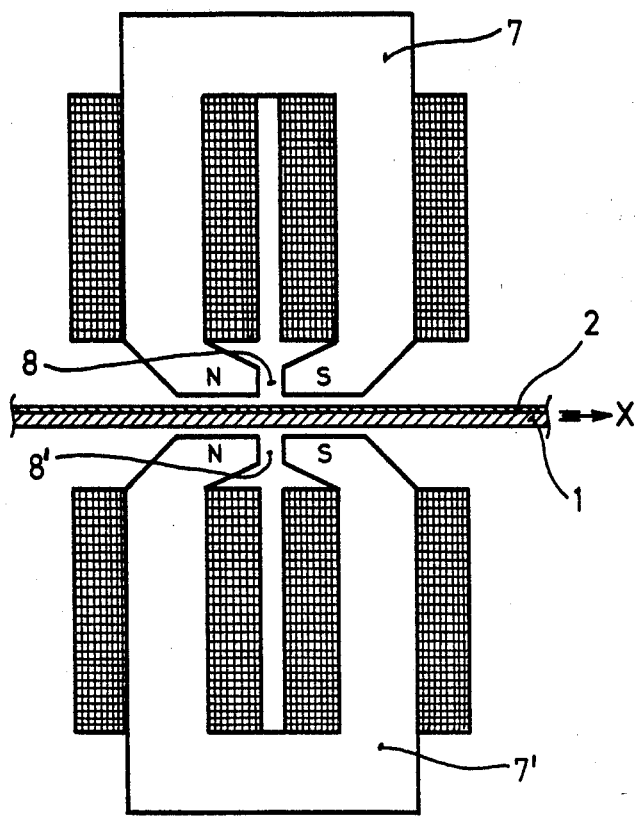
Figure 4:
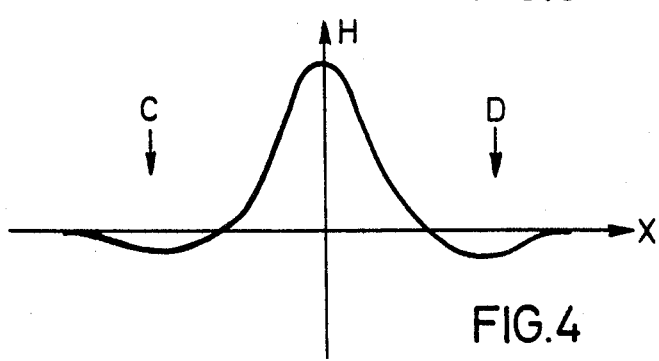

The invention will now be explained in further detail with reference to the accompanying drawing, in which FIG. 1 is a schematic cross-sectional view of the orienting device according to the invention, FIG. 2 shows the field strength distribution of the orienting field produced by the device of FIG. 1 in the plane of the magnetic coating, FIG. 3 is a schematic cross-sectional view of a prior art orienting device, and FIG. 4 shows the field strength distribution of the orienting field produced by the device of FIG. 3 in the plane of the magnetic coating.

Referring to FIG. 1, a base 1 carrying a fluid coating 2 of a dispersion containing magnetically anisotropic particles is passed in the plane of symmetry between two electromagnets 3 and 3' in the directionn indicated by arrow X. The ends of the three legs of each of the two E-shaped magnets have pole shoes which are so shaped that two pairs of coplanar air gaps 4,4' and 5,5' are formed, the surfaces of the pole shoes facing the coated base being parallel to the plane of said base. Coils 6 and 6' are wound on the middle legs of the E-shaped magnets, poles of like polrity facing each other; it is not critical whether the arrangement of the poles is S-N-S or M-S-N.

FIG. 2 shows the field strength distribution of the orienting field produced by the orienting device of the present invention in the plane of symmetry between the two E-shaped magnets in which the magnetic coating on the base travels.

To demonstrate the surprising effect achieved with the novel orienting device, the field strength distribution of the orienting field produced by the conventional electromagnetic orienting device of FIG. 3 is shown in FIG. 4. According to FIG. 3 a fluid coating 2 of a dispersion containing anisotropically magneitc particles applied to a base 1 is guided in the plane of symmetry between two magnets 7 and 7' in the direction indicated by arrow X, past two air gaps 8 and 8'.

A comparison of FIGS. 2 and 4 clearly demonstrates the advantageous design of the novel orienting device. In the case of the field strength distribution shown in FIG. 2, the anisotropically magnetic particles are subjected to a uniformly increasing and decreasing field (A and B respectively) at the outer edges of the outer poles, which edges run parallel to the air gaps. As is well known, not only is the maximum field strength, up to a specific limiting value, responsible for the final orientation of the magnetic particles in the layer of dispersion and hence in the magnetic coating which results after solidification, but also the field strength distribution in the region where the coated base leaves the orienting device, i.e. in region B. As shown in FIG. 2, in the case of the orienting device of the present invention, the magnetic orienting field relative to the coated web moving away from the device uniformly decreases to zero.

By contrast, in the case of the prior art orienting device shown in FIG. 3, a field acting in the opposite direction to the orienting field proper is produced in region D (cf. FIG. 4). Although the strength of this opposing field is only 10% of that of the orienting field and consequently too low to reverse the magnetization of the magnetic particles, it is high enough to interfere with the orientation of the anisotropically magnetic particles.

With the orienting device according to the present invention it is possible to appreciably improve the orientation of the anisotropically magnetic particles in the magnetic coating. Depending on the type of magnetic material and the composition of the coating containing this material, the orientation ratio, i.e. the ratio of residual induction in the direction of orientation to that in the crosswise direction, can be improved by at least 25% and as much as 50%.

The composition and preparation of the dispersion of the magnetic materials in the dissolved polymeric binder are conventional.

The magnetic material used is preferably finely divided optionally modified acicular gamma-iron (III) oxide, preferably having an average particle size of from 0.1 to 2 $\mu$m and especially from 0.1 to 0.9 $\mu$m or acicular chromium dioxide having the same particle structure as the above iron oxide. Further suitable materials are cubic gamma-iron (III) oxide modified with heavy metals, especially cobalt, and finely divided metal alloys of iron, cobalt and/or nickel.

The binder used for the dispersion of the finely divided magnetic materials may be one of those conventionally employed for the production of magnetic layers, for example an alcohol-soluble nylon copolymer, a polyvinylformal, a polyurethane elastomer, a mixture of one or more polyisocyanates and one or more polyhydroxy compounds or a vinyl chloride polymer containing more than 60% of vinyl chloride units (e.g. a copolymer of vinyl chloride with one or more comonomers such as a vinyl ester of a monocarboxylic acid of 2 to 9 carbon atoms or an ester of an aliphatic alcohol of 1 to 9 carbon atoms and an ethylenically unsaturated carboxylic acid of 3 to 5 carbon atoms—e.g. an ester of acrylic acid, methacrylic acid or maleic acid; a copolymer of vinyl chloride with one or more of these carboxylic acids as such; or a hydroxyl-containing vinyl chloride copolymer which may conveniently be obtained by partial hydrolysis of a vinyl chloride/vinyl ester copolymer or by direct copolymerization of vinyl chloride with one or more hydroxyl-containing monomers, e.g. allyl alcohol or 4-hydroxybutyl or 2-hydroxyethyl acrylate or methacrylate). Further suitable binders are mixtures of one or more polyurethane elastomers with one or more polyvinylformals, one or more phenoxy resins and/or one or more vinyl chloride copolymers of the composition mentioned above. Preferred binders are polyvinylformals and polyurethane elastomer-containing mixtures as just mentioned, especially mixtures with polyvinylformal(s). Preferred polyurethane elastomer binders are commercial elastomeric polyester-urethanes obtained from adipic acid, 1,4-butanediol and 4,4'-diisocyanatodiphenylmethane.

In magnetic dispersions which are particularly suitable for the production of rigid magnetic recording disks, the binder is preferably an epoxy resin, phenoxy resin, aminoplast precondensate, polyester resin, polyurethane or polyurethane-forming system, or a mixture of one such binder with another such binder or with one or more other binders, such as a polycarbonate, a vinyl polymer, e.g. a vinyl chloride copolymer, a vinylidene chloride copolymer, or a heat-curable acrylate or methacrylate copolymer.

The organic solvent may be an organic solvent conventionally used for making magnetic dispersions, especially an aromatic hydrocarbon, e.g. benzene, toluene and xylene, an alcohol, e.g. propanol and butanol, a ketone, e.g. acetone and methyl ethyl ketone, an ether, e.g. tetrahydrofuran and dioxane; a mixture of one or more such solvents with one or more other solvents, e.g. one or more other solvents conventionally used for surface-coating binders, may be employed.

One or more auxiliaries for the production of the magnetic layers may be added to the dispersions; examples of additives are dispersing agents, e.g. lecithins, small amounts of one or more monocarboxylic acids (in the case of chromium dioxide, such preferably being present in the form of zinc oleate, zinc stearate or zinc isostearate), fillers, e.g. carbon black, graphite, quartz powder and/or a non-magnetizable silicate-based powder, and flow improvers, e.g. small amounts of silicone oil. Advantageously, the amount of these additives should not exceed a total of 12 per cent by weight, preferably of 8 per cent by weight, based on the dry weight of the magnetic layer.

The magnetic layers can be produced in a conventional manner. The magnetic material is, for example, dispersed in the binder and a desired amount of solvent in a conventional dispersing apparatus, e.g. a tubular ball mill or a stirred ball mill, with addition of a dispersant and of any further additive(s). To obtain an advantageous binder solution-pigment ratio, the binder may be added to the mixture either as solids or in the form of solutions of from 20 to 60 per cent strength. It has proved advantageous to continue dispersion until the magnetic material has become extremely finely dispersed; this may require from 1 to 4 days. Subsequent repeated filtration gives a completely homogeneous magnetic dispersion.

The magnetic dispersion can be applied to the non-magnetizable base by means of conventional coating equipment. The non-magnetizable bases used may be conventional rigid or flexible substrates, especially films, disks or cards.

We claim:

1. A device for magnetically orienting the magnetizable particles of magnetic recording media other than metal discs in a preferred direction, which media are obtained by applying a coating of anisotropically magnetic particles finely dispersed in a solution of an organic binder system and conventional additives to a non-magnetic base, and subsequently solidifying the coating, by the action, on the still fluid coating, of the magnetic fields produced by two electromagnets which are arranged symmetrically with respect to, and in mirror-image relationship to, the plane of the said coating, and between the pole shoes of which air gaps are formed, wherein the two electromagnets are E-shaped and each have three pole shoes between which two coplanar air gaps are formed, the face of all three pole shoes of each said electromagnet extending in a plane parallel and in close proximity to the recording media, and the coils are wound on the middle legs of the E-shaped magnets.

* * * * *

UNITED STATES PATENT AND TRADEMARK OFFICE
CERTIFICATE OF CORRECTION

PATENT NO. : 4,382,244

DATED : May 3, 1983

INVENTOR(S) : KOESTER ET AL

It is certified that error appears in the above-identified patent and that said Letters Patent are hereby corrected as shown below:

In the Title: "Device for Magnetically Orienting the Magnetizable Particles or Magnetic Recording Media in a Preferred Direction"

should read

-- Device for Magnetically

Orienting the Magnetizable Particles of

Magnetic Recording Media in a

Preferred Direction --

Signed and Sealed this

Fifth Day of July 1983

[SEAL]

Attest:

GERALD J. MOSSINGHOFF

Attesting Officer

Commissioner of Patents and Trademarks